Nov. 6, 1923.

F. L. SAWYER

SCALE

Filed May 27, 1922

F. L. Sawyer Inventor

By C. A. Snow & Co.

Attorney

Nov. 6, 1923.  1,473,126
F. L. SAWYER
SCALE
Filed May 27, 1922    2 Sheets-Sheet 2
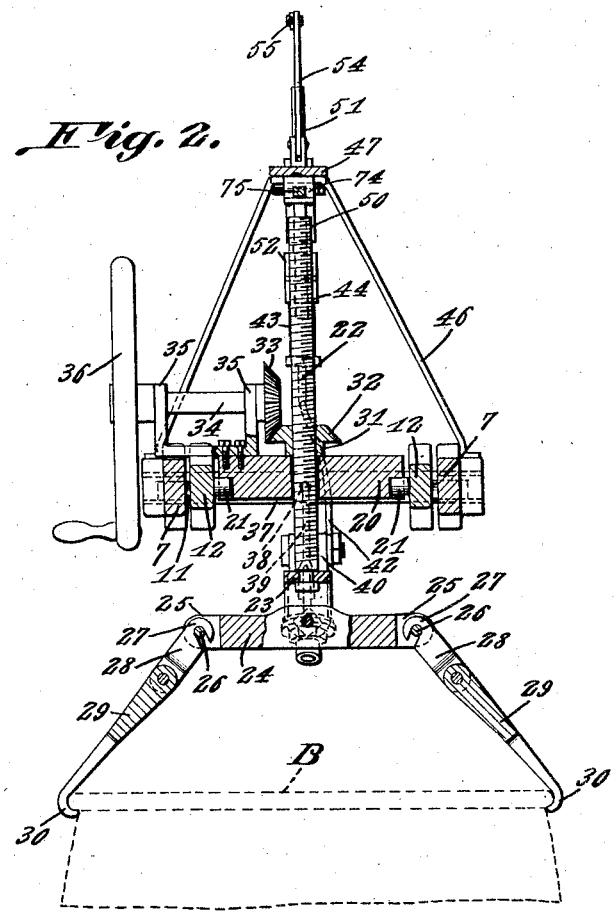
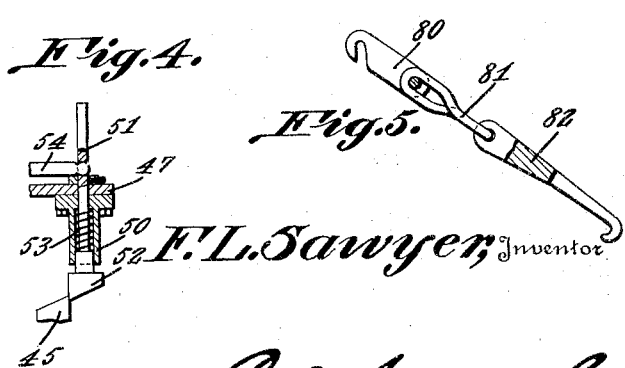
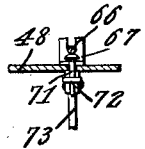
F. L. Sawyer, Inventor Patented Nov. 6, 1923.

1,473,126

UNITED STATES PATENT OFFICE.

FRED L. SAWYER, OF JACKSONVILLE, FLORIDA, ASSIGNOR TO SAWYER SPECIALTY SCALES COMPANY, OF JACKSONVILLE, FLORIDA, A CORPORATION.

SCALE.

Application filed May 27, 1922. Serial No. 564,159.

*To all whom it may concern:*

Be it known that I, FRED L. SAWYER, a citizen of the United States, residing at Jacksonville, in the county of Duval and State of Florida, have invented new and useful Scales, of which the following is a specification.

This invention relates to weighing scales designed primarily for measuring liquids by weight.

It has been the general practice heretofore, particularly in the handling of hydrocarbon oils to measure the product by volume but owing to their susceptibility to climatic changes a considerable loss has occurred in the checking up of the fluids.

It is an object of the present invention to provide weighing scales of the revolving type having means by which barrels and similar containers can be properly suspended from the scales and supported where they can be filled successively from a supply cock.

Another object is to provide means whereby when a predetermined weight of liquid is delivered to the barrel or other container the flow of liquid thereto will be automatically cut off and the scales can then be rotated to bring to filling position another barrel or the like that has already been properly connected to the scales and its tare determined.

A further object is to provide means for locking the scales against movement after a barrel has been brought to proper position relative to a supply cock.

A still further object is to provide means for automatically securing the cock in open position after the barrel has been positioned adjacent thereto, the said cock being kept open until released by the mechanism set in motion when the contents of the barrel reach a predetermined weight.

Another object is to provide a novel form of grapple for engaging a barrel and connecting it properly to the scales.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 2 is an enlarged section on line 2—2, Figure 1.

Figure 3 is an enlarged section on line 3—3, Figure 1.

Figure 4 is a section through the latch used for holding the cock in open position.

Figure 5 is a longitudinal section through a modified form of grapple member.

Figure 1:
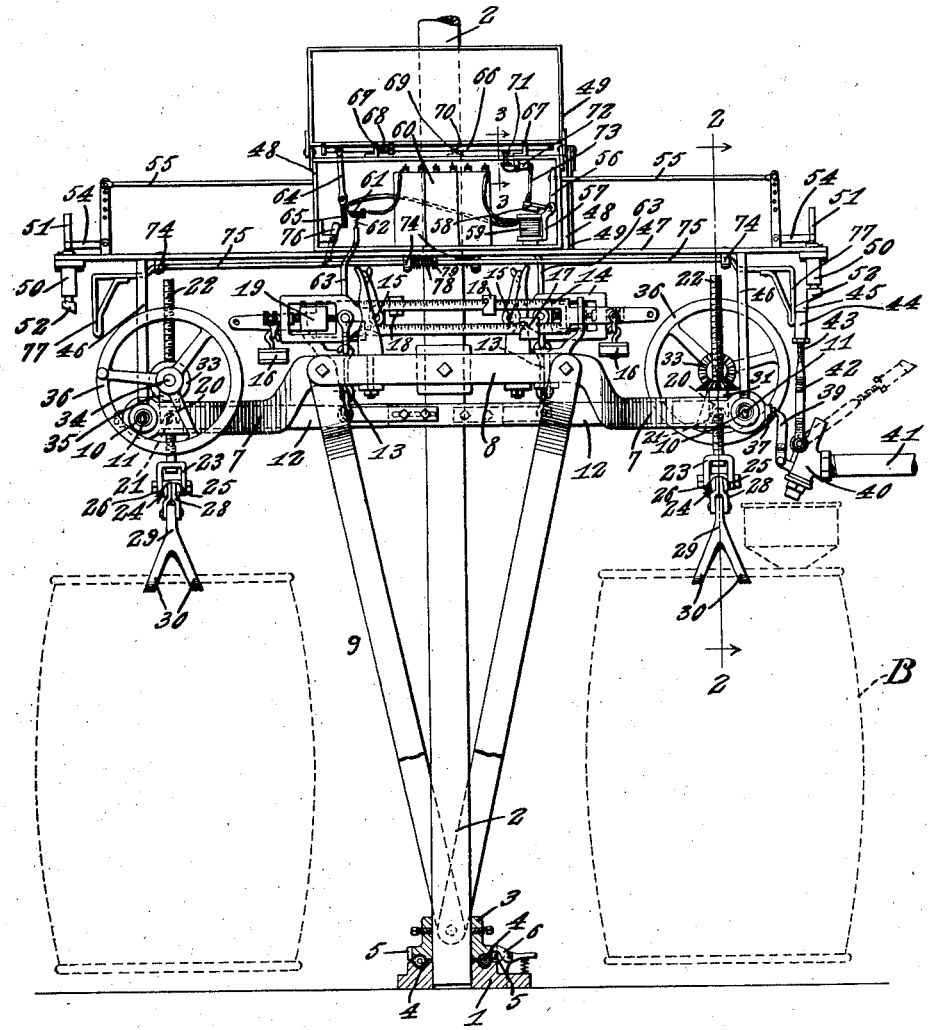
Figure 1 is a front elevation of the scales.

Referring to the figures by characters of reference 1 designates a bearing adapted to be secured to a floor or other supporting structure and mounted for rotation in this bearing is the lower end of a rotatable post 2 the upper end of which can be mounted in any suitable manner, not shown. Secured to this post is a collar 3 and antifriction bearings 4 are interposed between the collar and the bearing 1. Diametrically opposed notches 5 are formed in the collar and either one of these is adapted to receive a spring pressed locking dog 6 whereby the scales can be secured in either of two positions after being rotated through one-half a circle.

Mounted on the post 2 so as to rotate therewith are two identical scales structures each being arranged oppositely to the other and a description of one will suffice for both.

Each of the scales includes a yoke 7 having an upwardly offset arm 8 extending therefrom and secured to one side of the post 2 and to a pair of braces 9 the lower ends of which are attached to the collar 3. The yoke 7 has eyes 10 for receiving knife edge bearings 11 extending from one end of a beam 12, this beam being connected near its other end by links 13 or the like to a graduated beam 14 fulcrumed at 15 and provided not only with interchangeable weights 16 and a slidable weight 17 for measuring the load, but also with a tare weight 18 and an adjusting weight 19.

A cross bar 20 is supported within the beam 12 by bearing studs 21 and mounted to slide within this bar is a threaded stem 22 having a yoke 23 swiveled on the lower end thereof. A cross head 24 is pivotally mounted at its center within the yoke and has forked ends 25 across which are extended connecting pins 26. These pins are adapted to be detachably engaged by the hooked upper ends 27 of links 28, there being load gripping arms 29 pivotally connected to these links and having hooked forks 30 extending downwardly therefrom.

The threaded stem 22 is engaged by a nut 31 bearing on the bar 20 and provided with a beveled gear 32. This gear meshes with a gear 33 secured to a shaft 34. Said shaft is journaled in a bracket 35 secured to and movable with the bar 20 and a hand wheel 36 is secured to shaft 34 whereby it can be rotated readily for the purpose of turning the nut 31 and raising or lowering the stem 22. The outer end of the beam 12 has a cross strip 37 secured thereto provided with an opening 38 and this opening is adapted to receive a coupling hook 39 pivotally mounted on a discharge cock 40 secured to a supply pipe 41. This hook is designed to engage the strip 37 while the dog 6 is seated in one of the notches 5. Thus the scales will be held against rotation at two places and the proper positioning of a supported barrel B or the like relative to the cock 40 is thus insured.

The cock 40 is of the usual type adapted to close automatically under the action of a spring housed therein, this type of cock being well known and purchasable in the open market. The valve portion of the cock has an arm 42 extending radially therefrom and in the present instance the free end portion of the arm is screw threaded as at 43 so as to be adjustably engaged by a sleeve 44 provided with a beveled head 45.

Extending upwardly from the outer ends of the two yokes 7 are supports 46 on which is mounted a table 47. This table carries a housing 48 each side of which has a lid 49 normally concealing the contents of the housing. In Figure 1 the lid has been shown raised to expose the contents of one side of the housing.

As has heretofore been explained two sets of scales mechanisms have been provided and the same are duplicates. Each of the scales mechanisms is also provided with a control mechanism which is a duplicate of that provided for the other. One-half of the housing 48 contains mechanism belonging to one of the scales while the other half, not shown, contains similar mechanism belonging to the other scales.

Mounted on each end of the table 47 is a depending casing 50 in which a stem 51 is mounted to slide, this stem having a head 52 at its lower end which is beveled as shown and constitutes part of a latch. A spring 53 is mounted on the stem 51 for holding the head 52 normally pressed downwardly and that portion of the stem 51 above the table 47 is engaged by one end of a bell crank 54 mounted on the table. The other end of the bell crank is connected by a rod 55 to one arm of a bell crank 56 mounted on a bracket 57 in the housing 48. The other arm of bell crank 56 carries an armature 58 supported adjacent an electro-magnet 59.

The magnet 59 is electrically connected to a battery 60 in housing 48 and this battery in turn is electrically connected to a contact 61 supported by but insulated from a spring 62 extending from a finger 63 which projects from and moves with the beam 14. A lever 64 is fulcrumed in the housing 48 and has a contact portion 65 insulated therefrom and electrically connected to the magnet 59.

A rod 66 is slidably mounted in brackets 67 on the housing 48 and is normally pressed in one direction by a spring 68. This rod has a notch 69 therein adapted to receive a lug 70 when the rod is pushed against the action of spring 68 to one limit of its movement. This rod is pivotally connected to the lever 64 and slidably engages a lifting pin 71 extending from a lever 72. This lever is fulcrumed in the housing 48 and is connected to the lower arm of the bell crank 56 by a link 73.

Slidably mounted in brackets 74 on the bottom of the table 47 is a rod 75 one end of which is pivotally connected to one end of a shifting lever 76 adapted to engage the insulated portion of the lever 64. An arm 77 is extended downwardly from the other end of the rod 75 and into the path of the head 45. A spring 78 is mounted on rod 75 and bears at one end against a bracket 74 and at its other end against a collar 79 on the rod 75.

Under normal conditions the spring 78 thrusts the rod 75 toward the latch 52 and, consequently, the lever 76 is swung away from lever 64 while spring 68 holds the rod 66 pressed to the right in Figure 1 away from the position illustrated in said figure.

The arm 42 of the cock 40 is normally back in substantially the position indicated by broken lines in Figure 1 so that the flow of fluid is cut off. The wheel 36 is rotated so as to lower the grapple controlled thereby and the hooked forks 30 of the grapple are placed in engagement with diametrically opposed portions of the barrel to be filled. Wheel 36 is then rotated in the opposite direction so as to lift the barrel from the floor, a funnel is placed in the bung hole of the barrel and the weight 18 is adjusted to take care of the tare. The dog 6 is then shifted from its notch 5, hook 39 is disengaged from the strip 37, and the entire scales structure is rotated to bring the empty barrel with the funnel thereon into position under the cock 40 as shown at the right of Figure 1. Dog 6 will snap into a notch 5 when the barrel arrives at proper position. Hook 39 is also swung into engagement with strip 37. With the parts thus located the arm 42 is swung upwardly and will snap past the latch head 52 and be engaged and held thereby. This movement will also result in the head 45 pushing against arm 77 and sliding the rod 75 against the action of spring 78. This movement will cause lever 76 to swing lever 64 so that its contact 65 will be close to but spaced from the contact 61. Lever 64 will therefore pull on the rod 66 so as to compress spring 68 and bring the notch 69 into position to receive the lug 70. Lever 64 will thus be held and there will be no further action until the liquid which has begun to flow into the barrel B with the upward swinging of the arm 42 reaches a predetermined weight. At that instant the beam 14 tilts and swings finger 63 so as to bring the contact 61 yieldingly against the contact 65. Thus a circuit is closed through the magnet 59 which, being energized, attracts its armature 58. This causes rod 55 to pull on bell crank 54 and raise latch 52 with the result that the released arm 42 will swing to closed position through the action of the spring in the top 40. While this is taking place link 73 is pulling on lever 72 and forces pin 71 against rod 66. Thus said rod is lifted out of engagement with the lug 69 and will be shifted promptly by spring 66 so as to pull contact 65 away from contact 61 and break the circuit to the magnet. Spring 78 of course returns rod 75 and lever 76 to their normal positions when arm 42 is released. As soon as the supply of liquid has been cut off the operator shifts the hook 39 out of engagement with strip 37, disengages dog 6 from its notch 5 and again rotates the scales bodily. This will bring to position another empty barrel which has been placed on the scales during the filling of the preceding barrel. The filled barrel can now be removed and an empty one substituted therefor after which the operation hereinbefore described is repeated.

If, for any reason, the electrically controlled apparatus should fail to work at the proper time, the operator can, by swinging the bell crank 54, promptly release the arm 42 and the other mechanism of the scales.

Some barrels must be filled through bung holes in the sides thereof instead of in the heads. When such a barrel is reached the grapple members illustrated in Figure 2 are lifted off of the pins 26 and longer grapple members are substituted therefor. One of these has been illustrated in Figure 5 and comprises a hooked link 80 connected by an intermediate link 81 to a grapple member 82 similar to the member 29. Where two devices such as shown in Figure 5 are connected to the ends of the cross head 24 they can be placed in engagement with the ends of a barrel so as to support the barrel with the side bung hole at the top thereof in proper position to receive a funnel.

What is claimed is:—

1. The combination with rotatable weighing scales and separate means for supporting containers therefrom, of relatively fixed means for directing liquid into the containers successively when brought to position beneath the liquid directing means, and means for automatically cutting off the supply of liquid to a container when the contents of the container reach a predetermined weight.

2. The combination with means providing a liquid outlet, of means for measuring liquid by weight, said means including rotatable scales, separate means on the scales for supporting containers in position successively to receive liquid from the outlet, and means controlled by the action of a scales when the contents of the container reach a predetermined weight, for automatically cutting off the flow of liquid from the outlet.

3. The combination with means providing a liquid outlet, of means separate therefrom for measuring liquid by weight, said means including scales, separate means carried thereby for engaging and lifting separate containers respectively, said scales being bodily rotatable to bring containers successively into position to receive liquid from the outlet.

4. The combination with means providing a liquid outlet, of means separate therefrom for measuring liquid by weight comprising scales, means carried thereby for engaging and lifting a container, said scales being bodily rotatable to bring the supported container into position to receive liquid from the outlet, means for fastening the scales against movement when the container is so positioned and means controlled by the action of the scales when the contents of the container reach a predetermined weight, for cutting off the flow of the liquid from the outlet.

5. The combination with means providing a liquid outlet, of means for measuring liquid by weight comprising scales, a container engaging grapple, means for shifting the grapple relative to the scales to raise or lower a container engaged by the grapple, said scales being rotatable to position the engaged container for receiving liquid from the outlet.

6. The combination with means providing a liquid outlet, of means for measuring liquid by weight comprising scales, a grapple, for engagement with a container means for raising and lowering the grapple and the engaged container relative to the scales, said scales being bodily rotatable to position the engaged container for receiving liquid from the outlet, and means controlled by the action of the scales when the contents of the container reach a predetermined weight, for automatically cutting off the flow of liquid from the outlet.

7. The combination with a normally closed outlet cock, of means for measuring liquid by weight comprising independtly operating weighing mechanisms bodily rotatable about a common axis, means carried by each of said mechanism for engaging and supporting a container, said mechanisms being revoluble bodily to position their containers successively to receive liquid from the cock, means for holding the cock open while a container is in position therebelow, and means controlled by the action of the weighing mechanisms for automatically releasing the holding means and closing the cock when the contents of the container being filled reach a predetermined weight.

8. The combination with means providing a liquid outlet, of separately operable weighing mechanisms movable about a common axis, means carried by each of said mechanisms for engaging and supporting a container, said mechanisms being rotatable about said axis to successively position their supported containers to receive liquid from the outlet, and means for locking the mechanisms against rotation when either supported container is positioned to receive liquid.

9. The combination with an outlet cock normally closed and including an arm movable out of normal position to open the cock, of scales, means thereon for supporting a container, a latch, for engagement by the arm when moved to open position, an electro-magnet, means actuated by the movement of the scales under the action of the load on reaching a predetermined weight for closing a circuit to the electromagnet, and separate means controlled by the magnet for shifting the latch out of holding position and breaking the circuit to the magnet.

10. The combination with scales, and means connected thereto for supporting a container, of a valve holding latch, an electro-magnet, a movable contact, means for holding the movable contact out of normal position, another movable contact shiftable by the scales mechanism under the weight of the load to engage the first named contact and complete a circuit to the electromagnet, and separate means operated by the energizing of the magent for shifting the latch to releasing position and for reelasing the contact holding means to break the circuit through the contact and magnet.

11. The combination with scales and means carried thereby for engaging and supporting a container, of a folding latch, a spring controlled slidable member, said latch and member being positioned to be engaged and shifted by the arm of a supply cock when moved to open position, a pivoted contact, yielding means for holding said contact normally in one position, means operated by the slidable member for shifting said contact out of normal position, means for locking the contact out of normal position, an electro-magnet, means movable with the scales mechanism when actuated by the weight of a load for engaging the contact to complete a circuit to the electro-magnet, and separate means operated by the energizing of the electro-magnet for shifting the latch to release the engaged arm and for unlocking the pivoted contact.

In testimony that I claim the foregoing as my own, I have hereto affixed my signature.

FRED L. SAWYER.